US008255501B2

(12) United States Patent
Dorenbosch et al.

(10) Patent No.: US 8,255,501 B2
(45) Date of Patent: Aug. 28, 2012

(54) ESTABLISHING AN IP SESSION BETWEEN A HOST USING SIP AND A DEVICE WITHOUT AN IP ADDRESS

(75) Inventors: Jheroen P. Dorenbosch, Paradise, TX (US); Srinivas Miriyala, Fort Worth, TX (US)

(73) Assignee: Motorola Mobility LLC, Libertyville, IL (US)

( * ) Notice: Subject to any disclaimer, the term of this patent is extended or adjusted under 35 U.S.C. 154(b) by 2110 days.

(21) Appl. No.: 10/147,586

(22) Filed: May 15, 2002

(65) Prior Publication Data

US 2003/0217174 A1 Nov. 20, 2003

(51) Int. Cl.
*G06F 15/177* (2006.01)
(52) U.S. Cl. ........................................ 709/222; 709/228
(58) Field of Classification Search .................. 709/222, 709/228
See application file for complete search history.

(56) References Cited

U.S. PATENT DOCUMENTS

| | | | | |
|---|---|---|---|---|
| 6,757,732 B1 * | 6/2004 | Sollee et al. | ................... | 709/227 |
| 6,847,632 B1 * | 1/2005 | Lee et al. | ...................... | 370/352 |
| 6,870,817 B2 * | 3/2005 | Dolinar et al. | ................. | 370/252 |
| 2002/0065905 A1 * | 5/2002 | Kliland et al. | ................. | 709/220 |
| 2002/0133600 A1 * | 9/2002 | Williams et al. | .............. | 709/228 |
| 2002/0194331 A1 * | 12/2002 | Lewis et al. | ..................... | 709/224 |
| 2003/0014367 A1 * | 1/2003 | Tubinis | ........................... | 705/64 |
| 2003/0187926 A1 * | 10/2003 | Karjanlahti | ................... | 709/204 |

OTHER PUBLICATIONS

Overview of the Session Initiation Protocol (http://www.cisco.com/univercd/cc/td/doc/product/voice/sipsols/biggulp/bgsipov.htm).*
"The Authoritative Dictionary of IEEE Standard Terms", Seventh Edition, pp. 384-385, published in Dec. 2000.*

* cited by examiner

*Primary Examiner* — Thuong Nguyen

(57) ABSTRACT

An apparatus and method for establishing an IP session between a host 105 using a session initiation protocol and a device or mobile station 103 without an IP address is described. The apparatus includes a network interface 405 for receiving, via an IP connection, a session request that includes a host contact corresponding to the host and a device identifier corresponding to the device; a controller 407 for parsing the session request to determine the device identifier; preparing a message for the device that includes the device identifier and the session request, and presenting the message to the network interface, the message to be delivered to the device via a non-IP connection and to result in the device obtaining a device IP address and sending an acknowledgment of the SIP session request that includes the device IP address.

15 Claims, 4 Drawing Sheets

US 8,255,501 B2

ESTABLISHING AN IP SESSION BETWEEN A HOST USING SIP AND A DEVICE WITHOUT AN IP ADDRESS

FIELD OF THE INVENTION

This invention relates in general to communication systems, and more specifically to a method and apparatus for establishing an IP (internet protocol) session between a host using SIP (session initiation protocol) and a device without an IP address.

BACKGROUND OF THE INVENTION

Communications systems are known and continue to evolve rapidly as is quite evident in wireless communications systems. Systems have and are being deployed that allow packet data enabled mobile stations access to packet data networks such as the Internet or internet like networks that utilize IP addresses and packet data transport protocols such as IP.

Business models are being developed and businesses built based essentially on the ubiquitous access they are provided to a market place and consumers given these systems. However these businesses generally must rely on users initiating access to their services and thus are induced to pay for advertising on popular web sites such as Yahoo's site or popular Internet service provider sites. More recently various business models have proposed using push approaches or applications whereby, rather than waiting for consumers, they endeavor to initiate contact with the consumer and push information to the users regarding their services and wares. There are known session initiation protocols such as IETF SIP that allow a host to initiate contact with a client provided the client has an IP address.

This is a problem with the popular version of IP addresses, known as IPv4 addresses because the address space is not large enough for everyone to have an IP address at all times. The industry has resorted to dynamic addresses to solve this problem whereby a given user shares a limited number of IP addresses with others and thus is assigned an IP address when and only so long as one is needed as determined by the user or the user's device. Future versions of the internet protocol are expected to use a much larger address space commonly referred to as IPv6 at which point everyone can have a so called static IP address. In the meantime and for legacy equipment, even after IPv6 has been adopted, hosts that wish to push content via an IP network to a user or consumer are faced with a problem of setting up an IP session with a user or specifically a device that does not have an IP address. This is particularly so in wireless systems that only recently have evolved to allow any form of Internet or packet based access.

Clearly a need exists for methods and apparatus for establishing an IP session between a host using SIP and a device without an IP address. Preferably this will be transparent to the host using a session initiation protocol such as IETF SIP.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
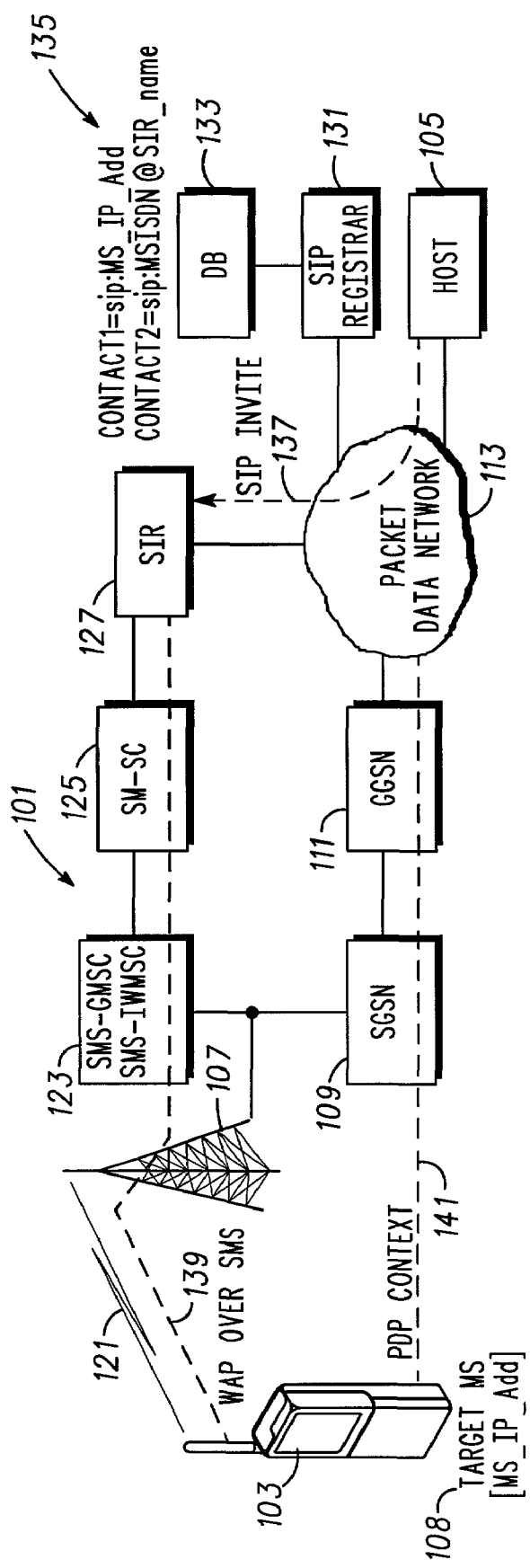
FIG. 1 depicts, in a simplified and representative form, a system level diagram of a communications system that utilizes an apparatus according to the present invention.

In overview form the present disclosure concerns communications systems that provide service to communications units or more specifically users thereof operating therein. More particularly various inventive concepts and principles embodied in methods and apparatus for initiating or establishing an IP (Internet Protocol) session between a host and a device or mobile station such as a cellular phone or other wireless and mobile device with that does not have an IP address are disclosed and discussed. The communications systems of particular interest are wireless and are those being deployed such as GPRS systems or those being planned that still employ IPv4 IP address spaces or those with Ipv6 spaces that must operate with legacy units or units without a static IP address or other systems using IP addressing and allowing for mobility of the communications services users.

As further discussed below various inventive principles and combinations thereof are advantageously employed to essentially induce the device or mobile station into setting up a PDP (packet data protocol) context that includes obtaining an IP address in a fashion that is transparent to the host and most of the communications system, thus alleviating various problems associated with known systems while still facilitating setting up sessions with or between hosts and mobile stations that were not attached to the packet data systems provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

Referring to FIG. 1 a simplified and representative form of a system level diagram of a communications system 100 that provides services via a RAN (radio access network) 101 for a device or MS (mobile station) 103 will be discussed and described. The RAN 101 is comprised of one or more base station controllers (not shown) that are coupled to one or more transceivers 107 (one depicted). The transceivers 107 are coupled to two paths within the RAN, one providing packet data based communications services and one providing conventional cellular voice services for the mobile station 103. A multiplicity of devices or MS including device or MS 103, when it has an IP address 108 [MS_IP_ADD], can be or is attached via the transceiver 107 to one or more known Serving GPRS Support Nodes (SGSN)s 109 (one depicted), and from there to one or more known Gateway GPRS Support Nodes (GGSN)s 111 (one depicted), The GGSN 111 is suitable for coupling the MS to a packet data network 113 and from there to other sites on the network such as Host 105. The Serving GPRS Support Node (SGSN) is the node that is serving the MS (i.e., the Gb interface is supported by the SGSN). At GPRS attach, the SGSN establishes a mobility management context containing information pertaining to e.g., mobility and security for the MS. At PDP Context Activation, the SGSN establishes a PDP (packet data protocol) context (includes an IP address for the MS among other info), to be used for routeing purposes, with the GGSN that the GPRS subscriber will be using. The SGSN and GGSN functionalities may be combined in the same physical node, or they may reside in different physical nodes. SGSN and GGSN contain IP routeing functionality, and they may be interconnected with IP routers.

The MS 103 or multiplicity of MS are also coupled via transceiver 107 to the other pathway that is part of the RAN 101, namely, one ore more Mobile Switching Centers (MSC) 123 (one depicted) at least one of which is coupled to and communicates with a known home location register (HLR) (not shown) that is typically a separate system entity. The MSC 123 enables, for example, a connection from the MS to the PSTN (public switched telephone network) to provide conventional cellular services. The RAN 01 also supports Short Message Services via one or more MSCs of the type SMS-GMSC (short message service-gateway mobile switching center) or SMS-IWMSC (short message service—inter working mobile switching center) 123 (one depicted) each as known. Short Message Service is coordinated by a SM-SC (short message service—service center) 125 that is coupled to the MSC 103 and in known systems from there to the packet data network 113. As discussed and described so far the RAN is generally known and operates in a scheduled fashion with transceivers to provide radio wave based communications paths 121 between the RAN and the mobile station 103 that operate on or over or through the RAN. Examples of such RANs include the General Packet Radio Service (GPRS), General Specialized Mobile (GSM), Personal Communications Systems (PCS), and other cellular systems as well as various next generation (2.5G, 3G) systems being proposed, developed, and defined such as EDGE (Enhanced Data-rates for GSM (or Global) Evolution), UMTS (Universal Mobile Telecommunications System), or CDMA 2000 and WCDMA (Wideband Code Division Multiple Access) and future evolutions thereof.

RANs were designed to support IP-based packet data applications that are initiated at the mobile station such as browsing the internet, accessing a bank account, or reading email. A PDP context, essentially an IP address or session including various associated parameters such data rates, security, etc., can be established using known RAN procedures by a PDP context activation procedure that is initiated by the mobile station. The GPRS procedures used for this purpose are described in 3G TS 23.060 V3.4.0 (2000-07), a *Technical Specification* available from or through a Web site maintained by the 3rd Generation Partnership Project; Technical Specification Group Services and System Aspects; General Packet Radio Service (GPRS); Service description; Stage 2 (published in 1999). This reference will also provide various information regarding the SM-SC, SMS-GMSC, and SMS-IWMSC and is hereby incorporated herein in its entirety by reference.

The mobile station's memory or possibly associated equipment (generally referred to hereinafter collectively as the MS or device) can be programmed with a long lived or permanent IP address for the MS. However, motivated by the insufficient number of IP addresses, available for example, with an IPv4 address space, most systems in order to limit the number of IP addresses needed to support the large number of devices, the MS typically obtains a temporarily assigned (short-lived) IP address when it activates the PDP context. Furthermore, the MS typically is programmed to de-activate the context as soon as it is no longer needed by an application running on the device, thereby releasing the short-lived or dynamic IP address for reuse by another MS. For example the MS 103 may activate a PDP context when the end-user starts to retrieve or send email and deactivate the context if all email has been retrieved or sent.

When a MS uses a long-lived IP address, a host 105 on the packet data network 113 can always reach the MS by sending an IP packet to the MS. Even when the MS does not have a PDP context when the IP packet is first sent, a standard RAN procedure further allows the Gateway 111 to request the establishment of a PDP context and thus to create an IP connection, provided the mobile has a known IP address. A procedure, known in GPRS and UMTS systems as Network Requested PDP Context Activation (NRCA), is typically triggered by sending a data packet to the gateway 111 using the long-lived IP address of the target mobile station. The Gateway will then collaborate with RAN entities, such as the mobile station, the SGSN, and the HLR, to activate the PDP context and to deliver the data packet.

However, a MS that uses a short-lived IP addresses cannot be reached in this way when or while it does not have an active PDP context, thus IP address. After the MS has released the short-lived IP address, the host 105 would not know which IP address to use when sending IP packets to the MS, essentially the host would have no way of resolving the MS identity. This invention solves this problem by disclosing a method and apparatus that enables a host 105, using a Session Initiation Protocol, to initiate an IP session with a MS without an IP address. Session Initiation Protocols are known with an example being SIP: Session Initiation Protocol available through the a website maintained by the (IETF) Internet Engineering Task Force; SIP WG identified as draft-ietf-sip-rfc2543bis-09.txt last published Feb. 27, 2002. Using the principles and concepts disclosed here provides an advantage in that it is transparent to the host 105 and the RAN 101 as so far discussed. In fact the host 105 does not need to know whether the MS currently has an active PDP context.

Suppose an application wants to push some information from the host 105 to the MS 103. The host 105 will use the Session Initiation Protocol (SIP) to initiate a session with the MS. SIP manages mobility in IP systems in a way that is similar to mobility management in cellular systems. Each IP user has a user name that looks like a typical URL: (sip:

userid@domain A). For each domain there is a SIP registrar 131 with a database 133 that keeps track of the location of the user, just like an HLR will keep track of where a cellular phone can be used. When a user moves to a new location (userid@domain_new), the user sends a SIP registration to the registrar. The registration message contains a 'Contact' 135 where the user can be reached. The registrar 131 stores the contact in the database 133 (until it is cancelled or expired). It is also possible to provide a Contact to the registrar on behalf of the user.

For the host or application on the host 105 to set up a session with a target or MS 103, the host 105 sends a SIP INVITE messages to that MS 103, for example (sip: userid@carrier.com). The SIP INVITE message will hereafter be referred to as SIP INVITE or simply INVITE. By the rules of the SIP protocol the message is first sent to the SIP registrar (sip:carrier.com). The message also contains the host contact or name or specifically host IP address and port number where a response is expected and the target's or MS 103 name. The registrar then looks up the Contact 135 for userid@carrier.com and either forwards the invite to the contact or returns the INVITE to the host with the Contact information so that the host or application can send the INVITE directly to the target. The later method is called 'redirection'. One more detail: a target can have more than one Contact 135 as indicated in the registrar. Contacts can be equal, in which case the INVITE is replicated and forwarded to each Contact simultaneously, or they can be ordered, in which case the contacts are tried one after the other, until one succeeds.

If the target MS 103 has a static IP address or has an active PDP context 141 with an IP address, the MS will have registered with its SIP registrar and the registrar will contain the MS's IP address as a contact, namely sip:MS_IP_Add. In this case a SIP INVITE and push data can be delivered using prior art solutions. The preferred embodiment is such that this prior art behavior is retained. If, however, the target MS is using a dynamic IP addresses and does not currently have an active PDP context (IP address), then contact 1 in FIG. 1 will not be found in the Registrar. The preferred embodiment however provides a special contact, Contact2 of the form shown MSISDN@SIR_name, in the MS's registrar and a novel entity, designated SIR (session initiation relay) 127 that is expected to be a separate entity but may be part of the RAN 101 or another system entity that together ensure that the MS will activate a PDP context to obtain an IP address, and thus receive the SIP INVITE.

In summary Contact2 includes a phone number, MSISDN, for the particular MS and identifies the SIR 127 as the location or target to receive the SIP INVITE 137. As explained earlier, the registrar 131 will either forward the INVITE to the SIR or, in the event that redirection is used, the host 105 will send the INVITE directly to the SIR. The SIR will parse the message to obtain the MS identifier and encapsulate the INVITE message in a WAP (wireless access protocol) formatted message that can be forwarded to the MS using Short Message Service message and processes, depicted as WAP over SMS 139 in FIG. 1. The balance of this disclosure will include a description of a registration method for a mobile station with reference to FIG. 2, a description of the preferred method of establishing an IP session with reference to FIG. 3, and a description of a block diagram of the SIR 127 with reference to FIG. 4.

Figure 2:
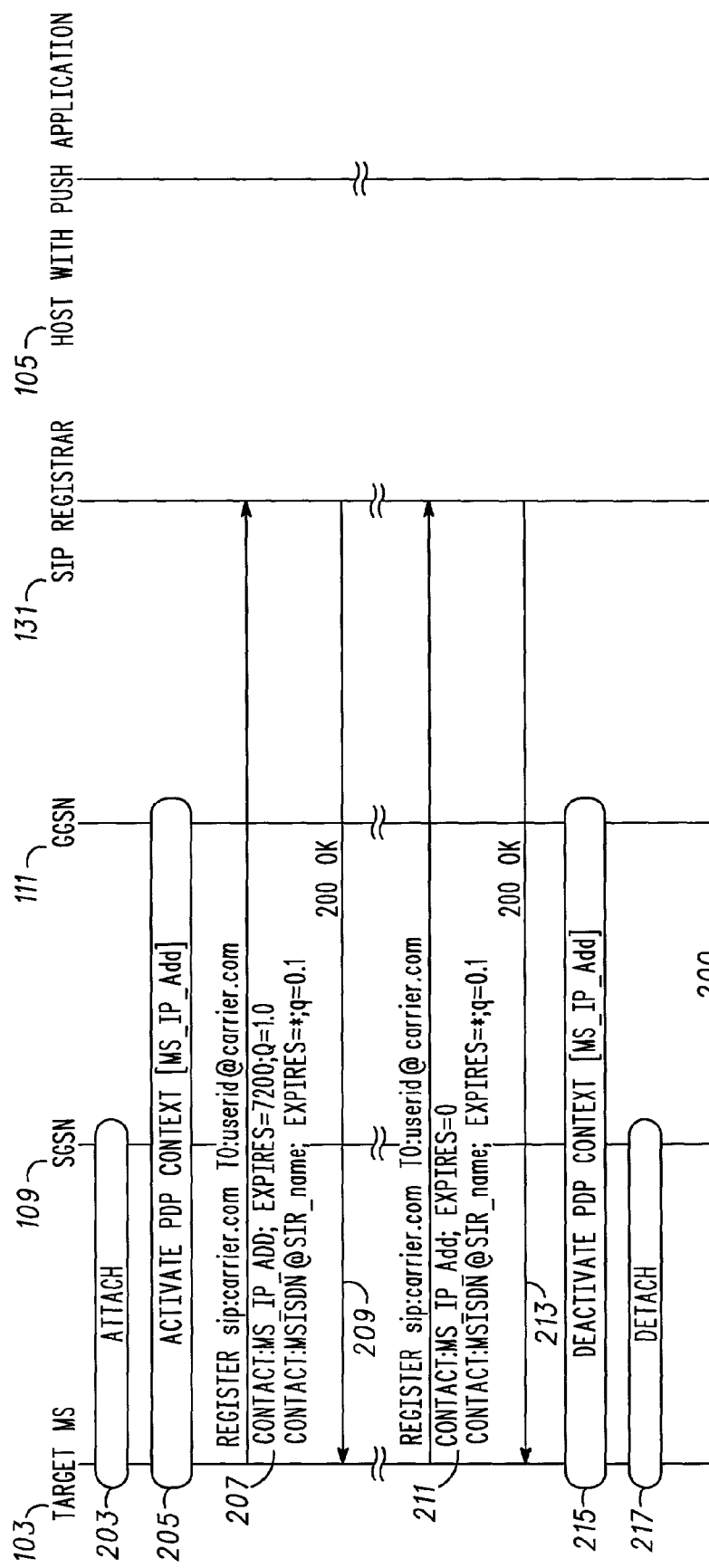
FIG. 2 depicts a ladder diagram illustrating a registration method for a mobile station according to the present invention.

Referring to FIG. 2 a ladder diagram illustrating a registration method for a MS will be discussed and described. FIG. 2 shows an essentially standard session initiation protocol registration process excepting that a novel version of a contact, namely Contact2, being placed with the Registrar 131.

There are several ways by which Contact2 can be put into the MS's SIP registrar: The operator, service provider or user can send a single registration message to the user's registrar. It specifies Contact2 for the MS (sip:MSISDN@SIR_name), and further specifies that the contact does not expire (Expires: *) and that the contact should be tried with low priority or rank order (q=0.1). If the MS later does a SIP registration it will add a second Contact, namely contact1 that contains its IP address and has high rank order. As long as the MS remains registered, the registrar will first try to send an INVITE directly to the MS's IP address. The burden of Contact management can thus be placed on the MS. When the MS gets an IP address it registers with that address as Contact. Before it releases the IP address it registers again, cancels the Contact with the IP address, and thus effectively activates the Contact2 (sip:MSISDN@SIR_name).

The FIG. 2 ladder diagram illustrates this when the MS initiates and manages the SIP registration. The MS 103 attaches to the SGSN 109 at 203 and activate a PDP context [MS_IP_Add] with the GGSN 111 at 205. At 207, via the GGSN and packet data network 113 the MS send a sip registration message to the MS's SIP Registrar 131, REGISTER sip:carrier.com, To: userid@carrier.com with two contacts one with an IP address, MS_IP_Add, reasonable expiration time of 7200 secs (2 hours), and high relative priority of 1 and the second special contact or Contact2, MSISDN@SIR_name, that never expires (* designates never expires in SIP) but has a low relative priority of 0.1. Note this Contact2 or special contact only needs to be sent upon the initial registration or whenever it has been cancelled or perhaps is in question. Furthermore it need not be sent at this time since the MS has an IP address noted by the contact with MSISDN (e.g. a telephone number that resolves to the target MS 103). In any event the registration is acknowledged by the Registrar at 209. Thereafter the MS may conduct whatever transaction it wishes via the packet date network, for example read email, browse the Web or even receive push material from the host 105. At some time later 211 the MS sends another registration message that indicates the IP address expires immediately (Expires=0) and reiterates the Contact2 or special contact with the MSISDN MS identifier. Note this re-iteration is not necessary if this contact information has been previously sent and not changed. In fact this contact need only be sent one time. In any event this registration message is acknowledged at 213. Then the PDP context [MS_IP_Add] is deactivated at 215 and the MS detaches at 217. The host 105 with the push application has been included in FIG. 2 only to make the point that it is not involved or even aware of the registration activities and thus they are transparent thereto.

Figure 3:
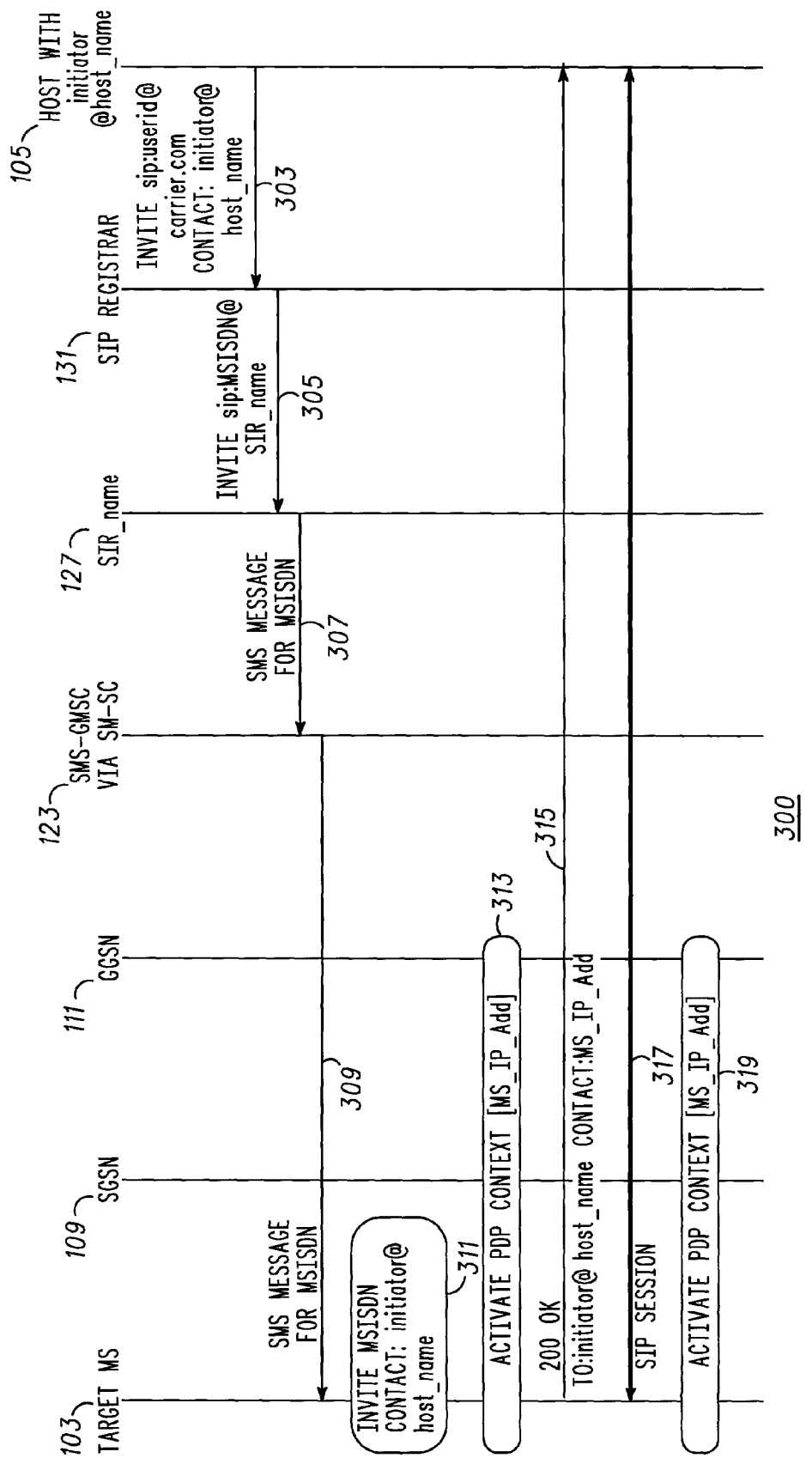
FIG. 3 depicts a ladder diagram illustrating a preferred method of establishing an IP session in accordance with the present invention.

Referring to FIG. 3 a ladder diagram illustrating a preferred method of establishing an IP session when the MS does not have an IP address will be discussed and described. FIG. 3 illustrates a method of initiating an Internet Protocol (IP) session between a host 103 using a session initiation protocol and a device 103 without an IP address. The SIP registrar contains the special contact URL for the target MS. The contact can be put in the registrar in several ways, as discussed above. The contact is of the form sip:userid@host and is chosen such that each INVITE for the target MS 103 is forwarded to the SIR instead. For this reason the contact uses the host name of the SIR. Furthermore, the SIR must be able to determine the identity of the target MS. For this reason the user name contains the MS's MSISDN. The URL thus looks like sip: MSISDN@SIR_name. The push application, at 303 at the host 105 designated initiator@host_name sends a SIP INVITE to the MS, addressed by the MS's known SIP name sip:userid@carrier.com so the INVITE is routed to the Registrar 131. Note that there are no new or non-standard requirements for the contents of the SIP INVITE; the push application does not need to be aware of the principles and concepts of the SIR operation.

The SIP registrar 131, upon receiving the INVITE, checks for the contact address of sip:userid@carrier.com. Lets assume that there is only one contact address for that MS, namely sip: MSISDN@SIR_name. The Registrar then forwards the INVITE to the specified host, the SIR 127 at 305. Note that the SIP registrar in not modified and is not aware of anything novel about the contact or the inventive concepts and principles discussed herein.

The SIR, upon receiving the session request, including the host contact or initiator address and port number that corresponds to the host, or INVITE message, via an IP connection, will parse the requested URL (sip:MSISDN@SIR_name) to extract or determine the device identifier or MS's MSISDN. It will then prepare a message, including the session request, for the device, specifically an OTA-WSP PDU (Over The Air—Wireless Session Protocol Packet Data Unit). This message is then forwarded to the device or MS via a non-IP connection in a fashion that results in the device obtaining a device IP address and sending an acknowledgment of the session request that includes the device IP address.

The SIR 127 uses a new combination of protocols to deliver or cause to be delivered the SIP INVITE message 137 to the MS 103. The SIR uses concepts and processes developed by the Wireless Application Protocol Forum (Ref: "Wireless Application Protocol Architecture Specification". WAP Forum; WAP-210-WAPArch-20010712-a. Specification for the WAP protocols are available at www.wapforum.org). The WAP defines a push architecture that allows a proxy like the SIR 127 to send data to a terminal in an asynchronous manner. The SIR and the terminal communicate using the known Push OTA protocol, which utilizes WSP and/or HTTP (Hyper-text Transport Protocol, RFC 2068) services. The Push OTA protocol is described in WAP-235-PushOTA-20010425-a. This invention uses a protocol variant, which is referred to as "OTA-WSP ("Wireless Session Protocol". WAP Forum. WAP-230-WSP-20010705-a.). OTA-WSP is designed to be suitable for use with low-bandwidth bearers. In particular, it does not require an IP bearer.

In the preferred embodiment, the SIR 127 uses OTA-WSP in a connectionless way to push or forward the SIP INVITE message to the MS. Connectionless push is always performed using the WAP wireless datagram protocol WSP/WDP (WDP "Wireless Datagram Protocol". WAP Forum≠ WAP-259-WDP-20010614-a.). Using WSP/WDP the SIR 127 can forward the SIP INVITE to a WDP port on the MS. WSP/WDP allows the push content or here SIP INVITE to be delivered to an application on the MS, as identified by an Application-ID in the WSP/WDP message. In the preferred embodiment, the SIR and the MS use a common definition of a new application code to represent the IETF Session Initiation Protocol SIP. By using this application code as application-ID in a WSP/WDP message, the SIR 127 can make the MS 103 extract the push content and provide it as input to a SIP application running on the MS 103.

For the purpose of delivery of the WSP/WDP message to the MS 103, the SIR 127 preferably uses the know Short Message Service protocol (SMS). The use of SMS is described in 3G TS 23.040 (available at www.3GPP.org—see above) and ETSI TS 100 901 V7.4.0 (1999-12) *Technical Specification* Digital cellular telecommunications system (Phase 2+); Technical realization of the Short Message Service (SMS); (GSM 03.40 version 7.4.0 Release 1998) each of which are hereby incorporated herein in there entirety by reference. SMS is typically used and especially adapted to deliver short text messages from an external device to a MS that are to be displayed on the user interface of the MS and to send text messages from the MS to an external device.

To send a Short Message (SM) to a MS, one typically contacts a Short Message—Service Center (SM-SC) 125. The SM-SC will forward the message via an appropriate SMS-GMSC or SMS IWMSC 123 for delivery OTA via a transceiver 107 to the MS 103. Standard methods exist to buffer a SM in case a MS is temporarily unavailable and to deliver a SM via a SGSN 109 in case the MS 103 is on an OTA packet data channel. In addition, known methods exist to deliver longer messages by fragmenting them into several short messages. As mentioned above, under normal use the payload of a SM that is sent to MS 103 will be displayed on the user interface of the MS. However, SMS allows the SIR to add information to the SMS header that prevents display of the payload, and instead routes the payload to an application on the MS. For the preferred embodiment, the SIR specifies the payload to be delivered to WSP/WDP (Alternatively the SIR can specify a payload like a SIP INVITE to be delivered directly to the SIP application but this may not be as widely supported by MSs).

Large wireless systems may includes more that one SM-SC, SMS-GMSC, or SMS-IWMSC. In most cases the SIR 127 can readily determine which of these is serving the MS identified by the MSISDN. This determination can be simplified or facilitated by providing additional information in the Contact2. For example, use a contact format that includes the identification of the SM-SC or MSC, such as, respectively, MSISDN&SM-SC_id@SIR_name or MSISDN&SMS-GMSC_id@SIR_name. The SIR can then parse the requested URL and determine both the identity of the MS and routing information or identification information for the SM-SC or SMS-GMSC.

Thus, to deliver the SIP INVITE message 137 to the MS 103 the SIR 127 encapsulates the SIP INVITE message 137 in the payload of a WSP/WDP message, specifying delivery of that payload to the SIP application, and encapsulates the WSP/WDP message in the payload of a SMS message, specifying delivery of that payload to WSP/WDP port on the MS 103. The PDU is addressed to the SIP application on the MS (the SIR sets the Application ID value to 'SIP application', a predetermined identifier for the SIP application known to both the SIR and the MS). The payload of the PDU is the SIP INVITE. The SIR normally changes the Request URL of the INVITE to indicate that the INVITE is for the MS (tel:MSISDN). The SIR may optionally insert a SIP Via header field into the SIP INVITE, thereby forcing the response from the MS to be routed via the SIR, the optional Via header containing the address of the server, e.g. Via SIP/2.0/UDP SIR_name. The SIR127 sends an SMS message including the OTA-WSP PDU to the SMS—GMSC 123 via the SM-SC 125 to be sent to the MS, addressed by MSISDN at 307. The SMS-GMSC/SMS IWMSC 123 uses known SMS delivery mechanisms and processes to transmit the SMS message to the MS, addressed by MSISDN at 309.

When the MS receives the message at the WDP port it passes the message to the OTA-WSP layer. The OTA-WSP layer in the MS extracts the payload and looks at the application ID to forward the payload. In this case the SIP INVITE message will be forwarded to the SIP application at 311. The SIP application in the MS, upon receiving the INVITE message will have a need for IP service and thus will activate a PDP context or cause the activation of a PDP context with the GGSN at 313 and send the 200 OK or acknowledgment of the session request to the initiator at the host at 315, using its newly assigned device IP address, MS_IP_Add, preferably an IPv4 address. The MS inserts the newly assigned IP address into the 200 OK as the new Contact where the user can be reached (standard behavior). The 200 OK message is preferably delivered to the host 105 through the SGSN and GGSN packet data network.

Alternatively, the SIR may encapsulate and instruction in the SMS message that forces the MS to send a packet to the SIR via IP, for example, by forcing the MS to do a SIP registration with the SIR, or to acknowledge to the SIR with a HTTP POST message that contains the MS's MSISDN. Again the MS will activate a PDP context 141, if one does not already exist, and use the context to send an IP acknowledgement to the SIR, using the IP address 108 associated with the PDP context 141. From the acknowledgment returned to the SIR, the SIR learns the MS's OP address. The SIR proceeds to tell the host 105 what the device IP address is using the SIP redirection techniques. The host 105 will then redirect the INVITE directly to the MS, using the IP address 108 associated with the context 141. In any event future IP messages for the same session will not have to go via the SIR. A SIP session can be conducted between the MS 103, a packet data enabled device and the host or push application at the host using the packet data network as indicated at 317. Once the session is over the PDP context can be deactivated as indicated at 319.

Figure 4:
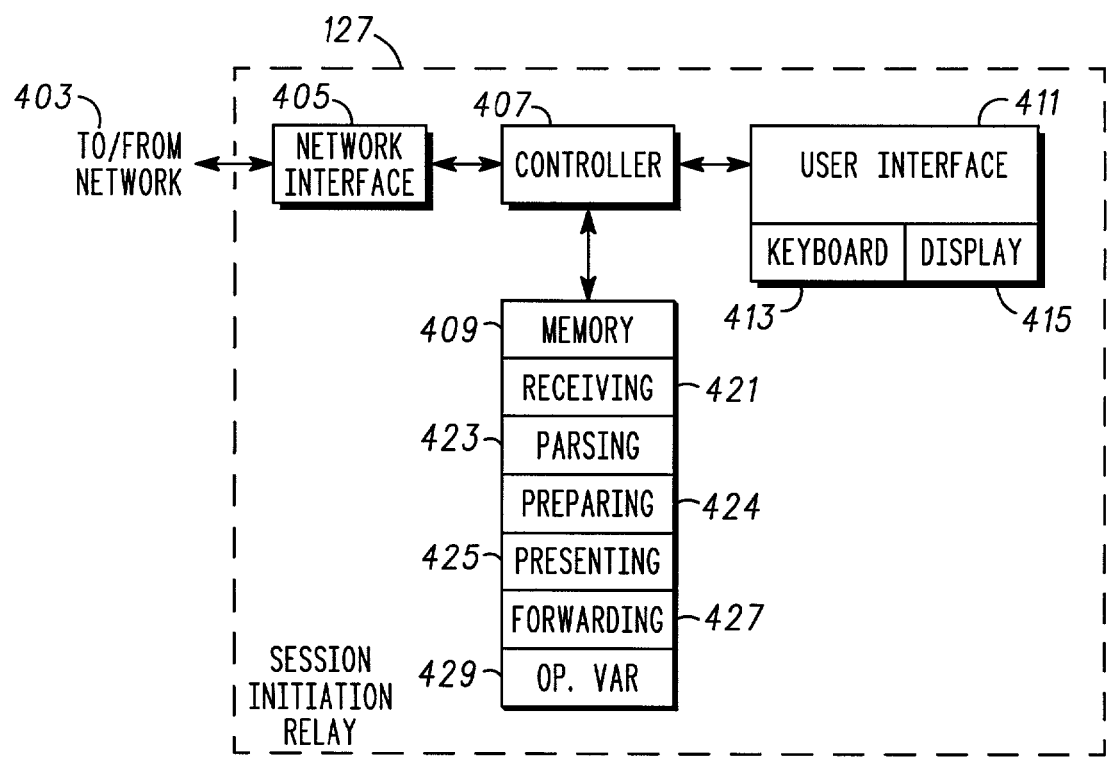
FIG. 4 depicts a block diagram of the apparatus of FIG. 1 according to the present invention.

Referring to FIG. 4 a block diagram of the apparatus of FIG. 1, specifically the SIR 127, will be discussed and described. This discussion will include an overview of the functionality of the SIR 127 that will include a summary of a portion of the operation discussed above. The SIR is a known computer based entity that is arranged and constructed and operates to perform the inventive functions in accordance with the concepts and principles herein described. The SIR can be a separate entity or can be additional functionality that co-exists with another entity such as one of SM-SC. The SIR (session initiation relay) 127 is coupled to and from a Network 403 (packet data network 113 and one or more SM-SC 125) by a network interface 405 that provides the known basic network interface functions. The network interface 405 is inter coupled and controlled by a controller 407 that includes one or more known processors or micro processors and digital signal processors. The controller 407 is further inter coupled to a memory 409 and user interface comprising a conventional keyboard 413 and display 415 or monitor.

The memory includes software routines that when executed by the controller or processors thereof perform various routines such as receiving 421, parsing 423, preparing 424, presenting 425, and forwarding 427 and numerous others in addition to operating parameters and variables 429 that generally result in operation of the SIR as herein described. The SIR is an apparatus for enabling the establishment of an Internet Protocol (IP) session between a host using a session initiation protocol and a device without an IP address. The apparatus includes the network interface 405 for receiving, via an IP connection, a session request that includes a host contact corresponding to the host 405 and a device identifier, for example MSISDN, corresponding to the device, preferably a packet data enabled MS 103. Further included is the controller 407, coupled to the network interface, for parsing the session request to determine the device identifier; preparing a message for the device that includes the device identifier and the session request, and presenting the message to the network interface. The message is arranged and formatted for delivery to the device via a non-IP connection and to result in the device obtaining a device IP address and sending an acknowledgment of the SIP session request that includes the device IP address.

Preferably the message to be delivered to the MS or device is a short message service message that is delivered via a short message service message center. The message includes the session request, preferably a SIP INVITE message encapsulated in an over the air wireless session protocol packet data unit. When the packet data enabled device receives the message and unwinds it, the device will obtain a device IP address, typically an IPv4 address by activating a packet data protocol context and thereafter send a SIP OK message to the host via the packet data network or alternatively via the SIR and SIP redirection. Preferably the network interface receives a SIP:INVITE message addressed to a user name that is a telephone number for the device and thus corresponds to the device identifier. The controller prepares the message as an over the air wireless session protocol packet data unit that encapsulates the SIP:INVITE message as the payload and presents, via the network interface, the message to a short message services center for delivery to the device as a short message services message. The SIP:INVITE message is, preferably, received by the apparatus as a result of a SIP registrar including a SIP:CONTACT corresponding to the device, where the SIP:CONTACT includes a host name corresponding to the apparatus.

The apparatus and methods discussed and described above, and the inventive principles and concepts thereof are intended to and will alleviate problems caused by prior art packet data systems. Using these principles of establishing IP sessions with mobile stations that do not have an IP address will allow another entity such as a host using a session initiation protocol such as IETF SIP to push packet data to the MS in a transparent or using known SIP techniques and thus facilitate connectivity for mobile professionals.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of initiating an Internet Protocol (IP) session between a host using a session initiation protocol and a device without an IP address, the method comprising the steps of:
   receiving at a relay, via an IP connection, a SIP INVITE request originated by the host that includes a host contact that corresponds to the host and a device identifier that corresponds to the device;
   parsing, at the relay, the SIP INVITE request to determine said device identifier;
   preparing, at the relay, a message for the device that includes said SIP INVITE request; and
   forwarding said message from the relay to the device via a non-IP connection, said message resulting in the device obtaining a device IP address and sending an acknowledgment of the SIP INVITE request that includes said device IP address.

2. The method of claim 1 wherein said forwarding said message from the relay to the device utilizes a short messaging service message.

3. The method of claim 2 wherein said message is an Over The Air-Wireless Session Protocol Packet Data Unit message that encapsulates the SIP INVITE request.

4. The method of claim 1 wherein said device is a packet data enabled mobile station.

5. The method of claim 1 further comprising the steps of registering with a SIP Registrar a plurality of contacts for the device where at least one contact of said plurality of contacts points to the relay.

6. The method of claim 5 wherein the at least one contact of said plurality of contacts has a priority lower than an other contact of said plurality of contacts.

7. The method of claim 1 wherein obtaining a device IP address comprises extracting said SIP INVITE request from said message and activating a packet data protocol (PDP) context.

8. An apparatus for enabling the establishment of an Internet Protocol (IP) session between a host using a session initiation protocol and a device without an IP address, the apparatus comprising in combination:
  a network interface for receiving, via an IP connection, a SIP INVITE request originated by the host that includes a host contact corresponding to the host and a device identifier corresponding to the device;
  a controller, coupled to said network interface, for
    parsing the SIP INVITE request to determine said device identifier;
    preparing a message for the device that includes said device identifier and said SIP INVITE request, and
    presenting said message to said network interface, said message to be delivered from the apparatus to the device via a non-IP connection and to result in the device obtaining a device IP address and sending an acknowledgment of the SIP INVITE request that includes said device IP address.

9. The apparatus of claim 8 wherein said message is to be delivered from the apparatus to the device via a short messaging service center in the form of short messaging service message.

10. The apparatus of claim 9 wherein said message is an Over the Air-Wireless Session Protocol Packet Data Unit message that encapsulates the SIP INVITE request.

11. The apparatus of claim 8 wherein said device is a packet data enabled mobile station.

12. The apparatus of claim 8 wherein said device IP address is an IPv4 address, and said acknowledgment is a SIP:OK message.

13. The apparatus of claim 8 wherein said network interface receives said SIP INVITE request addressed to a user name corresponding to said device identifier and said controller prepares said message as an over the air wireless services protocol packet data unit that encapsulates said SIP INVITE request as the payload and presents, via said network interface, said message to a short message services center for delivery to the device as a short messaging services message.

14. The apparatus of claim 8 wherein said SIP INVITE request is received by the apparatus as a result of a SIP registrar including a SIP Contact corresponding to the device, said SIP Contact including a host name corresponding to the apparatus.

15. The apparatus of claim 8 wherein said message is a Short Messaging Service message that include an Over The Air-Wireless Session Protocol Packet Data Unit that encapsulates said SIP INVITE request.

* * * * *